US005278720A

United States Patent [19]

Bird

[11] Patent Number: 5,278,720

[45] Date of Patent: Jan. 11, 1994

[54] PRINTED CIRCUIT-MOUNTED SURGE SUPPRESSOR MATCHED TO CHARACTERISTIC IMPEDANCE OF HIGH FREQUENCY TRANSMISSION LINE

[75] Inventor: Anthony O. Bird, Melbourne, Fla.

[73] Assignee: Atlantic Scientific Corp., Melbourne, Fla.

[21] Appl. No.: 763,172

[22] Filed: Sep. 20, 1991

[51] Int. Cl.[5] .............................................. H02H 3/22

[52] U.S. Cl. .................................... 361/119; 361/120

[58] Field of Search ............... 361/119, 111, 117, 113, 361/120

[56] References Cited

U.S. PATENT DOCUMENTS

| | | | |
|---|---|---|---|
| 4,409,637 | 10/1983 | Block | 361/119 |
| 4,554,608 | 11/1985 | Block | 361/119 |
| 4,729,064 | 3/1988 | Singer, Jr. | 361/119 |

*Primary Examiner*—A. D. Pellinen
*Assistant Examiner*—S. Jackson
*Attorney, Agent, or Firm*—Charles E. Wands

[57] ABSTRACT

A surge suppressor for a high frequency transmission line contains a microstrip architecture comprising a dielectric sheet on a first side of which a signal conductor stripe layer is formed and on a second side of which a ground plane conductor layer is formed. The strip layer is disposed along a generally central linear region of the first surface, so as to facilitate direct connection to the center conductor of a pair of end connectors, such as type F coaxial connectors. The ground plane conductor layer is attached to the shield layer of the coaxial connectors. A gas discharge tube is coupled between a first location of the stripe layer and the ground plane layer. The discharge device may be mounted on the first side of the microstrip structure and is connected to the ground plane layer on the opposite surface by way of a plated through hole. The ground plane layer has an aperture of a prescribed area in mutual alignment with the stripe layer so as to effectively remove the distributed capacitance between the stripe layer and the ground plane along a defined length of the stripe. This decrease in the distributed microstrip capacitance coupled with the fact that the removal of ground plane metal leaves the overlying section of the center conductor as a length of inductance compensate for the alteration of the characteristic impedance by the connection of the discharge device between the stripe conductor layer and the ground plane layer.

20 Claims, 4 Drawing Sheets

PRINTED CIRCUIT-MOUNTED SURGE SUPPRESSOR MATCHED TO CHARACTERISTIC IMPEDANCE OF HIGH FREQUENCY TRANSMISSION LINE

FIELD OF THE INVENTION

The present invention relates in general to surge suppression devices for high frequency transmission lines and is particularly directed to a surge suppressor employing a printed circuit architecture for effecting inductive and capacitive matching to the characteristic impedance of the communication link.

BACKGROUND OF THE INVENTION

The proliferation of high data rate communication equipment in diverse user environments such as local area networks and VSAT systems, has increased the demand for electromagnetic impulse protection devices in a variety of system applications. As such, a particular requirement of such devices is that they appear invisible to signalling traffic; namely, they do not degrade the quality of the communication signal, for example, by way of insertion loss and unwanted signal reflections on the transmission line. An example of a conventional electromagnetic impulse device that is intended to be installed in a high frequency communication link without effectively creating a mismatch with the characteristic impedance of the line is described in the U.S. Pat. No. 4,409,637. According to the patented scheme, the increased capacitive reactance imparted by the coupling of a surge-suppressing (gas) discharge device between the center conductor and shield conductor of the transmission line is compensated by increasing the inductive reactance of the device, via control of the dimensions of the shield (ground plane) conductor and inductor segments that are coupled in circuit with the shield conductor structure. Unfortunately, although the patented device functionally serves its intended purpose, its diverse, multicomponent hardware configuration makes it expensive to manufacture.

SUMMARY OF THE INVENTION

In accordance with the present invention, there is provided a new and improved electromagnetic surge suppressor for a high frequency transmission line, which not only provides the requisite impulse suppression and characteristic impedance match with the line in which it is inserted, but is of a configuration which is relatively simple to manufacture, yet permits precise definition of component geometries through which the impedance matching characteristics of the device are determined.

For this purpose, rather than employ a plurality of discrete hardware elements which require close tolerance machining and terminal connections, the present invention employs a printed circuit architecture having a conductor structure geometry that not only defines the signal and shield interconnect links that are bridged by the impulse-shunting discharge device, but permits the geometries of such interconnect links to be readily formed into an inductor/capacitance structure that precisely compensates for the capacitive reactance of the discharge device.

The printed circuit structure is formed of a microstrip architecture, comprising a sheet of dielectric material on a first side or surface of which a first (signal line) conductor layer is formed and on a second side of which a second (ground plane) conductor layer is formed. The first conductor layer serves as the center conductor of the device and is disposed along a generally central linear region of the first surface, so as to facilitate direct connection to the center conductor of a pair of end connectors, such as type F coaxial connectors. The second conductor layer, which serves as a ground plane of the microstrip structure, is electrically attached to the shield layer of the coaxial connectors.

An electrical discharge device, such as a two terminal gas discharge tube, is coupled between a first location of the first conductive layer and a second location of the second conductive layer. The discharge device may be mounted on the either side of the microstrip structure. When mounted on the first side, it is connected to the ground plane layer on the opposite surface by way of a plated through hole. The ground plane layer has an aperture of a prescribed area in mutual alignment with the first conductor layer on the first surface of the dielectric so as to effectively remove the distributed capacitance between the first conductor layer and the ground plane along a defined length of the first conductor. This decrease in the distributed microstrip capacitance coupled with the fact that the removal of ground plane metal leaves the overlying section of the center conductor as a length of inductance compensate for the alteration of the characteristic impedance by the connection of the discharge device between the first conductor layer and the ground plane layer.

For those applications where it is desired to block D.C. current flow through the device, the first and second conductor layers are segmented into spaced apart portions, so as to interrupt the electrical continuity therethrough. The separations between the respective segments of each conductor are electrically (A.C.) coupled by respective surface-mountable chip capacitors. To facilitate attachment of the discharge device to the ground plane layer and, in the case of the use of D.C. blocking architecture, chip capacitors to the microstrip conductor segments, a third conductor layer may be formed on the first side of the dielectric layer, spaced apart from the signal stripe conductor, and electrically joined with the ground plane layer on the opposite side of the dielectric sheet by means of a plurality of conductive vias. The third conductor layer may be formed as a single layer portion or a pair of layer portions along each side of the stripe signal conductor layer.

External connectors for insertion of the device into a transmission line are provided by way of a first and second industry standard electrical connectors, such as a type F coax connectors. A first of these connectors is mounted at one end of the printed circuit board, having its center feed conductor directly electrically and mechanically connected (soldered) to one end of the first conductive (stripe) layer and its outer sheath similarly soldered to the adjacent end of the ground plane layer. A second of F type coaxial connector is mounted at the other end of the printed circuit board, having its center feed conductor soldered to a second end of the first conductive layer and its outer sheath soldered to the adjacent end of the ground plane layer.

The geometry of the first conductor strip and the permitivity of the dielectric board, which determine the characteristic impedance of the microstrip section, are such that the resulting characteristic impedance matches that (e.g. 75 ohms) of the transmission line in which the suppression device is inserted. In addition, as noted above, with the insertion of the discharge device, the removal of a prescribed area of the ground plane beneath the signal conductor strip compensates for the alteration of the desired characteristic impedance by the discharge device. Through empirical analysis, the actual area of ground plane conductor removed may be increased so as to 'fine-tune' the device for the bandwidth of operation and the characteristic impedance required. Namely, the geometries of the signal and ground plane layers are defined so as to match the characteristic impedance of the transmission line with the characteristic impedance represented by the combination of the dielectric board, the respective segments of the first and second conductive layers, any D.C.-blocking chip capacitors, the discharge device and any associated stray capacitance.

DETAILED DESCRIPTION

Figure 1:
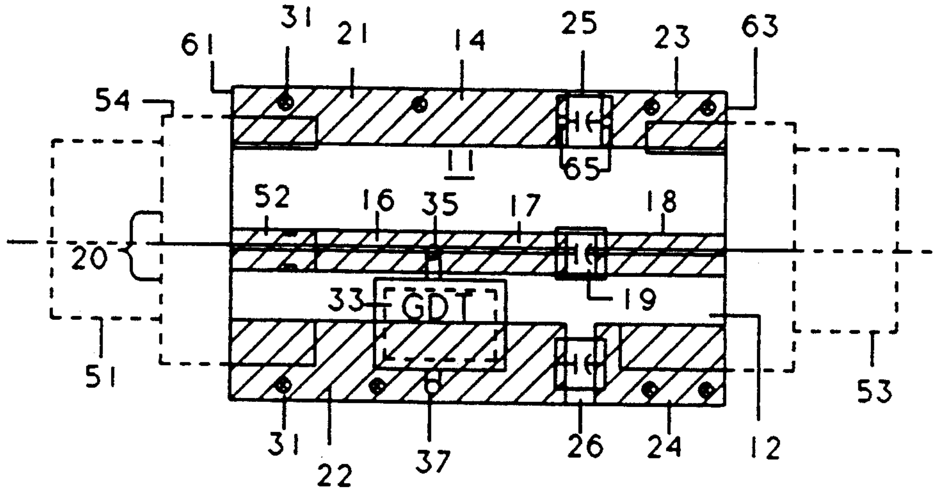
FIGS. 1 and 2 are respective top and bottom views of the configuration of a printed circuit board, microstrip architecture, upon which the components of the surge protector device of the present invention are mounted.
Figure 2:
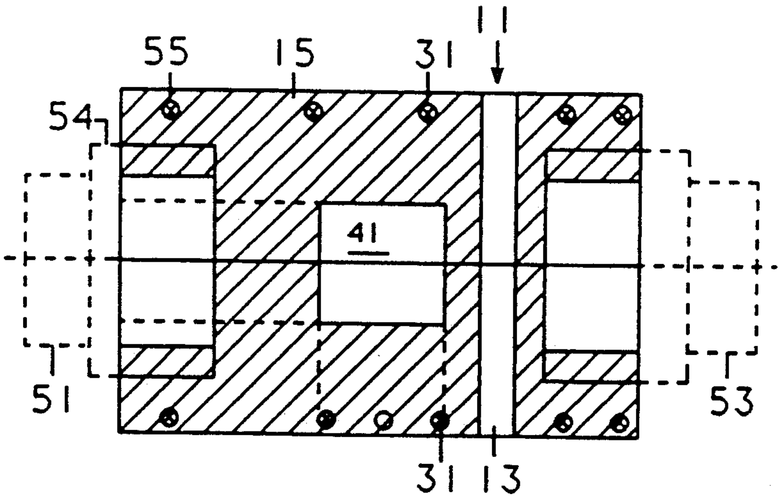

FIGS. 1 and 2, which are respective top and bottom views of the configuration of a printed circuit board, microstrip architecture, upon which the components of the surge protector device of the present invention are mounted, show the geometries of the manner in which layers of conductive material such as copper are selectively etched to define an inductive reactance compensation pattern for obtaining its desired characteristic impedance matching properties and to facilitate electrical connection of the etched network to standard (type F) coax connectors.

The printed circuit structure may comprise a sheet or board 11 of dielectric material, opposite surfaces 12, 13 are provided with respective layers 14, 15 of conductive material, such as copper. Board 11 itself may comprise a material such as FR4, having a thickness on the order of 1.6 mm. As shown in FIG. 1, conductive layer 14 formed on surface 12 of dielectric sheet 11 is selectively etched to define a first conductive stripe 16. For purposes of illustrative embodiment, it will be assumed that the suppression device is to effectively block D.C. current, although this is not necessarily a requirement for all applications. In the D.C. blocking case, stripe 16 is segmented into a first stripe portion 17 and a second stripe portion 18, separated from stripe portion 17 by a separation region 19 therebetween, thereby interrupting the continuity of stripe 16 at that location. This first signal conductor layer 16 effectively serves as the center conductor of the surge suppression device and is preferably disposed along a generally central linear region 20 of the top surface of dielectric sheet 11 in order to align stripe 16 with the center conductors of respective coaxial connectors that are mountable to opposite ends of the device, as will be described.

The masking pattern for selectively etching the conductor layer on the top surface 11 of the printed circuit board may further define an adjacent pair of generally linear, segmented conductor portions 21, 23 and 22, 24 spaced apart from opposite sides of center stripe 16. Conductor portions 21, 23 are separated by a spacing 25, while conductor portions 22, 24 are separated by a spacing 26, which spacings correspond to the separation 19 of the segments of the center stripe 16 for D.C.-blocking purposes. Where D.C.-blocking is not to be employed, this auxiliary conductor layer portions are not segmented.

Conductor portions 21, 23 and 22, 24 are conductively joined to ground plane layer 15 by means of a plurality of through holes 31 that are filled with a conductive interconnect metal. An electrical discharge device 33, such as a two terminal gas discharge tube 75 V manufactured by C. P. Clare is electrically and mechanically coupled (e.g. soldered) between a first location 35 of the first conductive layer 16 and a second location 37 of one of the adjacent conductor portions, here conductor portion 22.

As described earlier, because of its substantial capacitance, the insertion of discharge device 33 changes the characteristic impedance of the microstrip structure from that (e.g. 75 ohms) of the transmission line. To compensate for this change, a portion 41 of the ground plane layer underlying conductor strip 16 is removed, so as to restore the intended impedance of the device. Removal of the ground plane over a prescribed length of conductor stripe 33 effectively decreases the capacitive reactance along that section of the center conductor and inserts an inductive component into the signal path over, thereby compensating for the capacitive reactance component of the discharge device. The area A of the portion 41 of ground plane layer 15 to be removed is approximately defined by the relationship A=Cd/(Eo*Er), where Eo is the permitivity of free space, Er is the relative permitivity of the dielectric 11 (e.g. for G10, Er has a value on the order of 3.9). In addition to this calculated value of the area of ground plane layer to be removed, through empirical analysis, the actual area of the removed portion 41 of ground plane conductor layer 15 may be 'fine tuned' for the bandwidth of operation and the characteristic impedance required. Thus, the geometries of the signal and ground plane layers are defined, so as to match the characteristic impedance of the transmission line with the characteristic impedance represented by the combination of the dielectric board, the respective segments of the first and second conductive layers, any D.C.-blocking chip capacitors, the discharge device and any associated stray capacitance.

For those applications where it is desired to block D.C. current flow through the device, the signal conductor and the ground plane conductor are interrupted into spaced apart segmented portions, as described above, and one or more surface mount chip capacitors 43 are mounted in the separation or gap regions between the segmented conductors. To facilitate chip capacitor attachment between segmented portions of both the signal conductor 16 and the ground plane layer 15, the ground plane layer is preferably augmented by the provision of auxiliary 1 conductor layer portions 21, 23 and 22, 24, so that chip capacitors 43 may be mounted at adjacent locations on the same side of the board.

Figure 3:
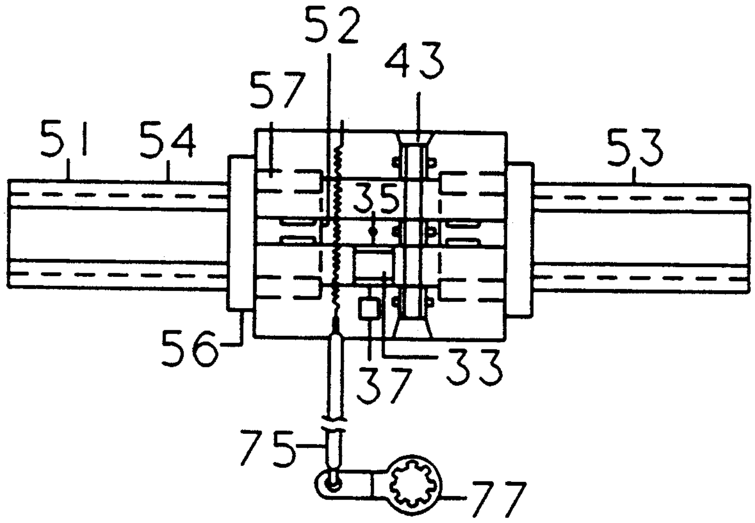
FIGS. 3–6 diagrammatically illustrate attachments of external connectors to the printed circuit board mounted surge suppressor of the present invention.
Figure 4:
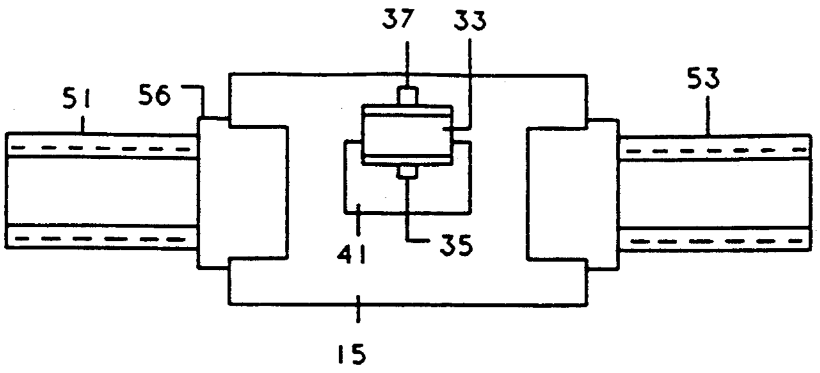
Figure 5:
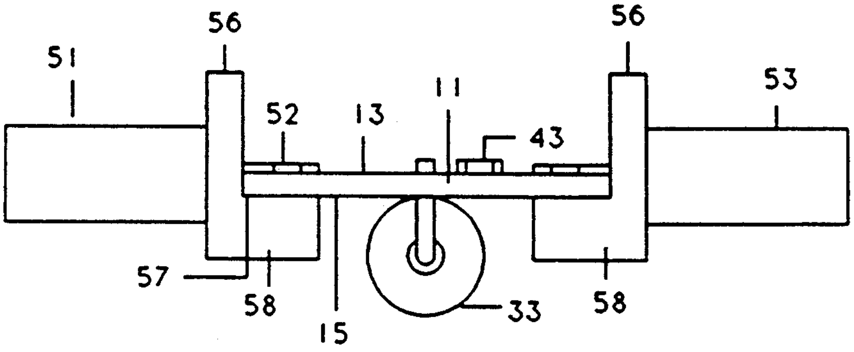
Figure 6:
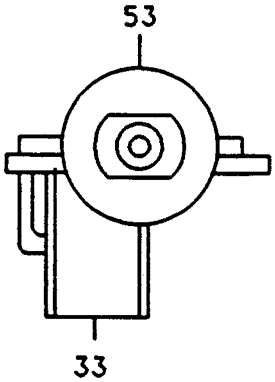

External connectors for insertion of the device into a transmission line are provided by way of a first and second industry standard electrical connectors, such as a type F coax connectors, as diagrammatically illustrated in broken lines 51 and 53 in FIGS. 1 and 2 and shown in greater detail in FIGS. 3–6. A first of these connectors, shown at 51, is mounted at a first end 61 of printed circuit board 11, having its center conductor 52 soldered to first stripe segment 17 of center conductor layer 16 and its outer sheath 54 connected to adjacent end regions 55 of ground plane layer 15. For this purpose a portion of the cylindrical shield of the larger diameter terminal end portion 56 of connector 51 is removed, as shown in FIGS. 4 and 5, so as be conformal with the bottom ground plane surface of the printed circuit board, thereby facilitating direct abutment of the flat surface 57 of shield wall 58 against the ground plane layer 15, and facilitating solder attachment at that location. Coax connector 53 is similarly attached to the other end 63 of printed circuit board 11, as shown.

Surface-mount chip capacitors 43 are mechanically and electrically attached to bonding pads 65 at terminal edges of the center conductor and ground plane segments on the top surface 12 of printed circuit board 11. Also shown in FIG. 3 is an optional ground strap 75 and associated terminal lug 77, that may be provided as desired.

Figure 8:
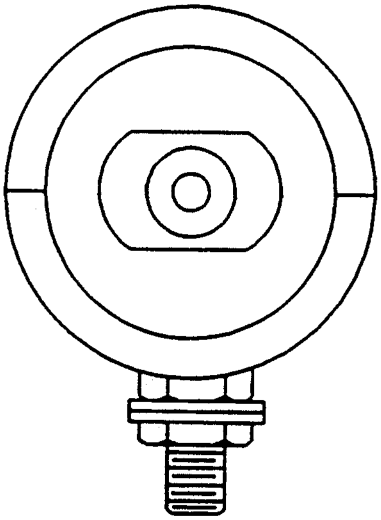
FIGS. 7 and 8 show respective exploded side views and an assembled end view of the packaging of the printed circuit board suppressor of FIGS. 1–6.
Figure 7:
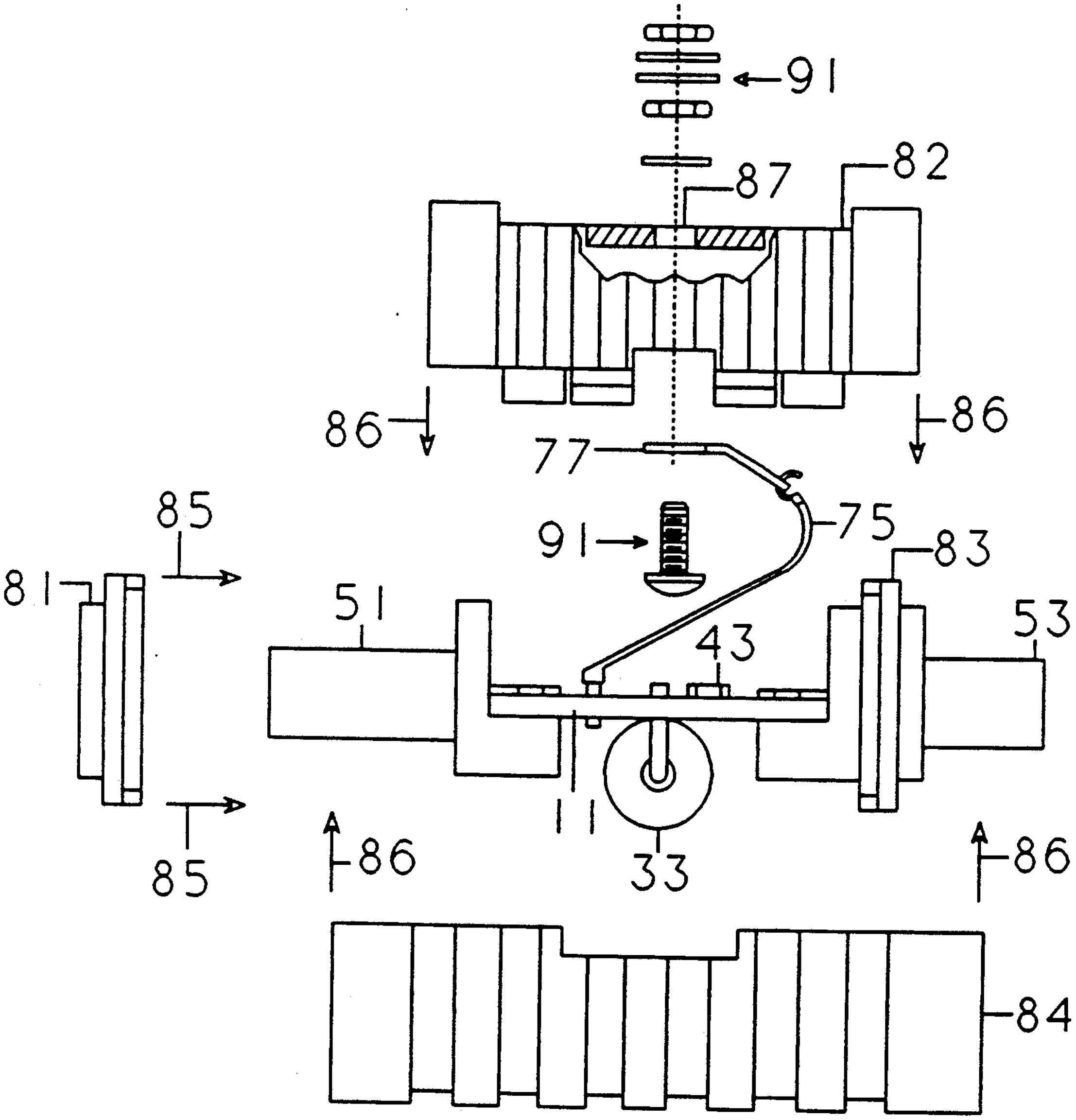

Packaging of the printed circuit board suppressor of FIGS. 1–6 may be effected by way of the assembly diagrammatically shown in an exploded side view in FIG. 7 and an assembled end view in FIG. 8. Respective annular plastic end caps 81, 83 are placed over connectors as shown, for example, by arrows 85, and then first and second halves 82, 84 of a plastic cylindrical casing are joined together, as shown at arrows 86, engaging end caps 81, 83, thereby enclosing the printed circuit board suppressor structure. Optional ground strap 75 and associated terminal lug 77 are attached to a feed through and external ground attachment screw assembly 91 which passes through aperture 87 in cylindrical casing half 82.

As will be appreciated from the foregoing description, the present invention provides a new and improved electromagnetic surge suppressor for a high frequency transmission line, which not only provides the requisite impulse suppression and characteristic impedance match with the line in which it is inserted, but is of a printed circuit configuration, which is both compact and is relatively simple to manufacture, permitting precise definition of component geometries through which the impedance matching characteristics of the device are determined.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed is:

1. A method of matching the characteristic impedance of a high frequency transmission line having first and second signal conductors, while effectively shunting electromagnetic impulse energy travelling therethrough, comprising the steps of:

(a) providing a printed circuit structure having a dielectric layer and first and second conductor layers disposed thereon;

(b) electrically interconnecting said first conductor layer with said first signal conductor, and said second conductor layer with said second signal conductor;

(c) coupling an electrical discharge device between said first and second conductor layers; and (d) defining the geometries of said first and second conductor layers so as to match the characteristic impedance of the transmission line with the characteristic impedance represented by the combination of said dielectric layer, said first and second conductor layers, said discharge device and stray capacitance associated with the combination thereof.

2. A method according to claim 1, further including the step of (e) interposing at least one capacitor element in series with the electrical circuit path through a respective at least one of said first and second conductor layers and said first and second signal conductors, respectively, and wherein step (d) comprises defining the geometries of said first and second conductor layers so as to match the characteristic impedance of the transmission line with the characteristic impedance represented by the combination of said dielectric layer, said first and second conductor layers, said at least one capacitive element, said discharge device and stray capacitance associated with the combination thereof.

3. A method according to claim 1, wherein said printed circuit structure comprises said dielectric layer, said dielectric layer having a first side and a second side, said first conductor layer has a first portion disposed on said first side of said dielectric layer, second and third portions disposed on first and second spaced apart portions of said second side of said dielectric layer, and conductive interconnect material providing a conductive connection between said first portion of said first conductor layer and said second and third portions of said first conductor layer, and wherein said second conductor layer is disposed on a third portion of said second side of said dielectric layer, spaced apart from and located between said first and second portions thereof.

4. A method according to claim 2, wherein said second conductor layer comprises first and second spaced apart conductor portions, and wherein said at least one capacitor element includes a capacitor element coupled in circuit between said first and second spaced apart conductor portions of said second conductive layer.

5. A method according to claim 1, wherein said first conductor layer has an aperture of a prescribed geometry that underlies a prescribed portion of said second conductor layer, and wherein said discharge device is connected between said prescribed portion of said second conductor layer and a prescribed location of said first conductor layer.

6. A method according to claim 5, further including a third conductor layer formed on said second side of said dielectric layer spaced apart from said second conductor layer, electrically connected to said first conductor layer, and wherein said discharge device is connected to said third conductor layer.

7. A method according to claim 6, wherein each of said first, second and third conductor layers comprises first and second spaced apart conductor portions thereof, and further including respective capacitor elements coupled in circuit between the first and second spaced apart conductor portions of said second and third conductor layers.

8. A method according to claim 7, wherein said printed circuit structure comprises a plurality of conductive vias providing a conductive connection between said first conductor layer and said third conductor layer.

9. A method according to claim 1, further including the step of (e) providing first and second coax connectors aligned with and electrically connected in circuit with respective spaced apart portions of said first and second conductor layers.

10. A device for matching the characteristic impedance of a high frequency transmission line having first and second electrical conductors, while effectively shunting electromagnetic impulse energy travelling therethrough, comprising, in combination:

a printed circuit structure having a dielectric layer and first and second conductor layers disposed on opposite sides thereof defining a microstrip transmission line structure therebetween;

an electrical discharge device coupled between said first and second conductor layers;

a first transmission line connector electrically connected to first portions of said first and second conductor layers; and a second transmission line connector electrically connected to second portions of said first and second conductor layers; and wherein the geometries of said first and second conductor layers are defined so as to match the characteristic impedance of the transmission line with the characteristic impedance represented by the combination of said dielectric layer, said first and second conductor layers, said discharge device and stray capacitance associated with the combination thereof.

11. A device according to claim 10, further including at least one capacitor element coupled in series with the electrical circuit path through a respective at least one of said first and second conductor layers and said first and second electrical connectors, respectively, and wherein the geometries of said first and second conductor layers are defined so as to match the characteristic impedance of the transmission line with the characteristic impedance represented by the combination of said dielectric layer, said first and second conductor layers, said at least one capacitive element, said discharge device and stray capacitance associated with the combination thereof.

12. A device according to claim 11, wherein said second conductor layer comprises first and second spaced apart conductor portions, and wherein said at least one capacitor element includes a capacitor element coupled in circuit between said first and second spaced apart conductor portions of said second conductive layer.

13. A device according to claim 10, wherein said first conductor layer has an aperture of a prescribed geometry that underlies a prescribed portion of said second conductor layer, and wherein said discharge device is connected between said prescribed portion of said second conductor layer and a prescribed location of said first conductor layer.

14. A device according to claim 13, further including a third conductor layer formed on said second side of said dielectric layer spaced apart from said second conductor layer, electrically connected to said first conductor layer, and wherein said discharge device is connected to said third conductor layer.

15. A device according to claim 14, wherein each of said first, second and third conductor layers comprises first and second spaced apart conductor portions thereof, and further including respective capacitor elements coupled in circuit between the first and second spaced apart conductor portions of said second and third conductor layers.

16. A device according to claim 15, wherein said printed circuit structure includes a plurality of conductive vias providing a conductive connection between said first conductor layer and said third conductor layer.

17. A device according to claim 10, wherein said first and second transmission line connectors comprise respective first and second coax connectors aligned with and electrically connected in circuit with respective spaced apart portions of said first and second conductor layers.

18. A device for matching the characteristic impedance of a high frequency transmission line having first and second signal conductors, while effectively shunting electromagnetic impulse energy travelling therethrough, comprising, in combination:

a printed circuit structure having a dielectric layer having first and second surfaces, first and second spaced apart segmented conductive layers formed on said first surface of said dielectric layer, and a third segmented conductive layer formed on said second surface of said dielectric layer;

conductive interconnect material providing a conductive connection between said second conductive layer and said third conductive layer;

an electrical discharge device coupled between a first location of said first conductive layer and a second location of second conductive layer;

a first capacitor element interposed in series with an electrical circuit path through said first conductive layer;

a second capacitor element interposed in series with an electrical circuit path through one of said second and third conductive layers;

a first electrical connector for electrically interconnecting said first conductive layer with a first portion of said first signal conductor and the interconnected second and third conductive layers with a first portion of said second signal conductor; and a second electrical connector for electrically interconnecting said first conductive layer with a second portion of said first signal conductor and the interconnected second and third conductive layers with a second portion of said second signal conductor; and wherein the geometries of said first, second and third conductive layers are defined so as to match the characteristic impedance of the transmission line with the characteristic impedance represented by the combination of said dielectric layer, said first, second and third conductive layers, said first and second capacitor elements, said discharge device and stray capacitance associated with the combination thereof.

19. A device according to claim 18, wherein said third conductive layer has an aperture of a prescribed geometry that surrounds a third location of said second surface of said dielectric layer, which third location is mutually aligned with said first location of said first conductive layer on said first surface of said dielectric layer.

20. A device according to claim 17, wherein said printed circuit structure comprises a plurality of conductive vias providing a conductive connection between said second conductive layer and said third conductive layer.

* * * * *